United States Patent [19]

Wales

[11] 3,961,968

[45] June 8, 1976

[54] METHOD FOR PRODUCING HYBRID BINDER FOR CERAMIC MOLDS

[75] Inventor: Wayne F. Wales, Elnora, N.Y.

[73] Assignee: Waukesha Foundry Company, Inc., Waukesha, Wis.

[22] Filed: Mar. 17, 1975

[21] Appl. No.: 559,191

Related U.S. Application Data

[63] Continuation-in-part of Ser. No. 455,687, March 28, 1974, abandoned, and a continuation-in-part of Ser. No. 76,609, Sept. 29, 1970, abandoned, and a continuation-in-part of Ser. No. 841,117, July 11, 1969, abandoned.

[52] U.S. Cl............................ 106/38.35; 106/287 S; 106/287 SE; 252/313 S; 106/38.3
[51] Int. Cl.² ........................ B28B 7/34; B01J 13/00
[58] Field of Search.......... 106/287 S, 287 SE, 38.2, 106/38.3, 38.35; 252/313 S

[56] References Cited
UNITED STATES PATENTS

| | | | |
|---|---|---|---|
| 2,455,367 | 12/1948 | King..................................... | 106/287 |
| 2,842,445 | 7/1958 | Emblem et al.................... | 106/38.35 |
| 3,576,652 | 4/1971 | Teicher et al..................... | 106/38.35 |
| 3,682,668 | 8/1972 | Fujita et al............................ | 106/74 |

*Primary Examiner*—Lorenzo B. Hayes
*Attorney, Agent, or Firm*—Wheeler, Morsell, House, & Fuller

[57] ABSTRACT

Methods of preparing Hybrid Silicate Binders are shown by admixing the following materials:
1. a basic or acidic colloidal silica sol suspended in water or glycol ether;
2. an organic silicate, such as ethyl silicate, hydrolyzed with water;
3. a mineral acid of sufficient quantity to produce a final binder having a pH of 1 to 4; and
4. the hybrid binder contains silica sol and organic silicates such that the ratio of weight contribution of $SiO_2$ from organic compounds to weight contribution of $SiO_2$ from colloidal silica sol is in the range between 0.09 to .9, in the final binder.

That is, $$\text{Silica ratio} = \frac{\text{Weight of silica contributed by organic silicate}}{\text{weight of silica contributed by silica sol}} = .09 \text{ to } .9$$

The final binder preferably contains about 18%–21% $SiO_2$. If basic silica sol is used it must be added to a mixture of the other ingredients.

The preferred binder has a shelf-life exceeding nine months, it can be chemically polymerized or air-set and provides high binder strength and refractoriness.

12 Claims, No Drawings

METHOD FOR PRODUCING HYBRID BINDER FOR CERAMIC MOLDS

This application is a continuation-in-part of my application Ser. No. 455,687 filed Mar. 28, 1974; Ser. No. 76,709 filed Sept. 29, 1970; and of my application Ser. No. 841,117 filed July 11, 1969, all now abandoned.

BACKGROUND OF THE INVENTION

The binder of this invention is a hybrid silicate binder for application to investment foundry molding processes. Investment foundries make use of three types of silicate binders. These are the alkali silicates (such as sodium silicate), organic ethyl silicates and colloidal silica sols. Each binder has its own advantages and one is not used universally over another.

Organic ethyl silicate, prehydrolyzed, is perhaps the most versatile of the silicates. Ethyl silicate has high refractoriness and can be chemically hardened with a given set time or hardened rapidly by air drying. Prehydrolyzed ethyl silicate produced in an alcohol base has the disadvantages of low bond strength, limited stability in refractory slurries and requires in-use explosion precautions.

Colloidal silica sol has advantages of high bond strength, good slurry stability and is aqueous based, thus eliminating fire hazards. The limitations of colloidal silica are that it cannot be chemically gelled and that its aqueous base produces slow air hardening.

Sodium silicate can be chemically hardened, but has the disadvantages of low refractoriness.

This invention is a novel approach to a binder which is a true synergistic reaction of colloidal silica sol and organic ethyl silicate providing a binder with the advantages of both silicates and has long shelf life and proven acceptance by investment casting foundries. Sodium silicate additions to the admixture were unsuccessful because of lowering binder refractoriness, shelf life and increasing cost. Also, glycol ether gels sodium silicate. Thus, sodium silicate is not usable for this invention. Polysilicates, described as silicates with very small particle size and low sodium to silica ratio may be substituted for colloidal silica.

Early attempts to achieve a universal binder were based on mixtures of ethyl silicate, colloidal silica sol and/or sodium silicate. A variety of patents attest to this approach. The Teicher U.S. Pat. No. 3,576,652 and the Emblem disclosure in U.S. Pat. No. 2,842,445 teach binder formulation with low colloidal silica sol volumes up to about 15% and high organic ethyl silicate volumes from 35% to 68%. The silica ratios in Teicher (Examples IA, IB, IC, and III) range from 2.03 to 14.5, while in Emblem (Examples 2, 3 and 7) they range from 5.8 to 13.6. Fujita disclosed, in U.S. Pat. No. 3,682,668, the addition of sodium silicate with ethyl silicate, however, high volumes of organic ethyl silicate were shown up to 80%. His silica ratio (Example III) is 1.87. These three patents teach binders of alcoholic base, which is a major limitation in binder properties and safety. All of these patents have failed to become accepted on a commercial basis for the following reasons:

1. The binders did not have long shelf life exceeding nine months because binders are made in alcoholic solutions.

2. Binder properties achieved were a compromise between the two binders and did not provide improved advantages to warrant production foundry use.

All three of these patents disclose binders having stability which is low in comparison to the binders made according to the present invention. If the examples were varied to approach the silica ratio here required, the binders would quickly gel because of the processes used. Such an approach would require an increase in silica sol which would lower stability. Thus my method must be used with my formula for successful results.

SUMMARY OF THE INVENTION

Ethyl silicate and other usable organic silicates must first be reacted with water to form a colloidal suspension of silicic acid and polymers of silicate before it can be converted into a gel which forms the adhesive mold bond. Ethyl silicate is not miscible with water, but the two liquids can be held in suspension, one in the other, by mechanical agitation. However, by the addition of a solvent such as alcohol, solubility of ethyl silicate with water is attained. The reaction of ethyl silicate with water, hydrolysis, takes place very slowly and must be catalyzed with an acid or a base.

Both of the techniques herein disclosed involve the acidification of ethyl silicate, prior to mixture with silica sol, to incorporate all excess acid required to acidify the silica sol. When the acid required in the final binder product is almost or entirely derived from the ethyl silicate, rather than from the sol, it is possible to incorporate in the binder a very greatly increased percentage of silica. This is a primary feature of the invention. In practice, the silica comprised in the silica sol is preferably a very finely divided silica, whereby binder strength becomes very great due to the increase in total silica particle surface area.

In the preferred procedure, the ethyl silicate is acidified but not fully hydrolyzed until the sol is added. The sol, being of water base, completes hydrolyzation and the resulting pH, due to the acidity of the ethyl silicate, is desirably below pH 5. An alkaline sol is only then added to the acid components, rather than being acidified directly, thereby avoiding the difficulties that prevent increasing the silica ratio in the formulations of the patents above.

According to the second technique, commercially available ethyl silicate is used, without regard to whether it is fully hydrolyzed or not. The ethyl silicate is acidified sufficiently to yield a binder of the desired acidity, and is only then diluted with commercially available silica sol. In this case, the hydrolysis reaction is slight but it is still possible to add sufficient silica sol to result in a binder having an amount of silica, and a silica ratio as herein defined, within my invention. The silica sol used herein preferrably contains 28%–34% available $SiO_2$, while the organic silicate preferably contains 28%–40% $SiO_2$. These are found in commercial products.

The silica ratio is defined as the ratio between weight contributed by organic compounds and the weight $SiO_2$ contributed by silica sol. While previous formulations were by volumes or weight of total constituents, it has been found that the silica ratio better predicts and defines operable ranges. Volume ranges give predictable results when a specific organic silicate composition and a specific silica sol composition are used, while the silica ratio gives predictable results with varying constituents. For the constituents specified herein the silica ratio is within the range of 0.09 to .9. The silica ratio affects the final products in ways not presently known, but it is essential to a product having acceptable stability and gellation times.

Because the sol can be kept indefinitely if alkaline, it is preferred that all of the acid required to reduce the ultimate binder to an acidity of about pH 2 will be present in the ethyl silicate.

It will be understood that any alcohol or ether or other mutual solvent for water and ethyl silicate can be added to some or all of the water in either of these formulations. The acid used may be hydrochloric, sulphuric, or other mineral or organic acid mutually compatible with the binder.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The binder of this invention begins with the original approach of a colloidal silica sol dispersed in a glycol ether, a water compatible solvent.

The presently available types of colloidal silica sol contain 28% – 34% available $SiO_2$ and are manufactured as follows:

1. Basic colloidal silica sol aqueous base is produced from alkali silicate to which is added sodium hydroxide and silicic acid and passed through an ion exchange resin.
2. Acid colloidal silica sol aqueous base is made by passing silica sol through an ion exchange pump where sodium is the counter ion and exchanges with hydrogen ion.
3. The above colloidal silica sols can be produced in a glycol ether media by distillation of the aqueous base where glycol ether replaces the water.

The glycol ether is from the group $CnH_{(2n+1)}OCH_2CH_2OH$ where $n = 1, 2, 3$ and $4$. Ethyl base glycol ether is preferred, however, methyl, propyl and butyl can be used. The diglycoldiethers such as diethylene glycol and diethylether can also be used in accordance with the examples following.

The aqueous colloidal silica sol dispersed in a glycol ether solution is now reacted with an organic silicate of the group of orthoethyl silicate or polyethyl silicate and comprises ethyl silicate, propyl silicate and the like.

The organic silicate has been previously reacted with acid and water to initiate hydrolysis of the organic silicate. Mineral acids used are of the group of sulfuric acid, hydrochloric acid, nitric acid and phosphoric acid. Acid is added to result in a final binder pH of from 1 to 4, about 2500 ppm, and water is added to not exceed 2%.

My preferred binder formulation is:

| | Parts by Volume |
|---|---|
| Organic Silicate | 5 – 10 |
| Colloidal Silica Sol | 30 – 75 |
| Water | 1 – 2 |
| Glycol Ether | 30 – 60 |
| Acid | 2500 PPM $H_2SO_4$ |

Alcohol can be substituted for the glycol ether if faster drying is desired in the binder, but must not exceed 50% of the glycol ether volume.

The preferred materials for the following formulations include:

1. An organic silicate, usually ethyl silicate, with 28%–40% by weight $SiO_2$, however, $SiO_2$ content may vary from this range provided volumes are adjusted to allow a final silica ratio of 0.09 to .9.
2. A colloidal silica sol with 28%–35% by weight $SiO_2$, however, $SiO_2$ content may again vary provided the volumes are adjusted to give the desired silica ratio.

Examples of binder formulations are as follows:

| | Example No. 1 | |
|---|---|---|
| | Material | cc. |
| a) | Organic Silicate | 98.20 |
| | Water | 13.25 |
| | Glycol Ether | 20.10 |
| | Acid (Sulfuric) | .45 |
| b) | Acid Colloidal Silica Sol (Aqueous Base) | 472.00 |
| | Glycol Ether | 396.00 |
| | Total | 1,000.00 |

According to the above mixture, and organic ethyl silicate, 40% silica, is hydrolyzed with water in the presence of ethylene glycol monoethyl ether and sulfuric acid (reaction a.).

The acidic colloidal silica sol, 30% silica and aqueous base, is dispersed in ethylene glycol monoethyl ether (mix b.). The acidic aqueous colloidal silica sol and the above mentioned products of reaction a. are mixed and agitated therewith.

The final binder has approximately 35% excess water.

| | Example No. 1-A | |
|---|---|---|
| | Material | cc. |
| a) | Organic Silicate | 98.20 |
| | Water | 13.25 |
| | Glycol Ether | 416.10 |
| | Acid | .45 |
| b) | Acid Colloidal Silica Sol (Aqueous Base) | 472.00 |
| | Total | 1,000.00 |

Example 1-A is essentially the same as example 1 with the exception that the glycol ether is added totally to the organic silicate portion (a) before final mixing with the silica sol.

| | Example No. 2 | |
|---|---|---|
| | Material | cc. |
| a) | Organic Silicate | 80.56 |
| | Water | 12.40 |
| | Glycol Ether | 18.54 |
| | Acid (Sulfuric) | 2.50 |
| b) | Colloidal Silica Sol (Glycol Ether Base) | 886.00 |
| | Total | 1,000.00 |

This mixture is the same as example 1 except that the colloidal silica sol is produced in an ethylene glycol monoethyl ether base by distillation out of water. The final binder of example 2 can be made with no excess water.

Example No. 3

| Material | cc. |
|---|---|
| a) Organic Silicate | 75.00 |
| Water | 12.75 |
| Glycol Ether | 14.75 |
| Acid (Hydrochloric) | 1.50 |
| b) Basic Colloidal Silica Sol (Aqueous Base) | 500.00 |
| Glycol Ether | 396.00 |
| Total | 1,000.00 |

Example 3 is the same as example 1 with the exception of using a basic colloidal silica sol and thus the acid must be increased.

Example No. 4

| Material | cc. |
|---|---|
| a) Organic Silicate | 75.00 |
| Water | 12.75 |
| Glycol Ether | 14.75 |
| Acid (Hydrochloric) | 1.50 |
| b) Basic Colloidal Silica Sol (Aqueous Base) | 496.00 |
| Glycol Ether | 200.00 |
| Ethyl Alcohol | 200.00 |
| Total | 1,000.00 |

Example 4 is the same as example 3 with the addition of ethyl alcohol as solvent to increase air drying ability.

Example No. 5

| Material | cc. |
|---|---|
| a) Organic Silicate | 75.00 |
| Water | 12.75 |
| Glycol Ether | 14.75 |
| Acid (Hydrochloric) | 1.50 |
| b) Basic Colloidal Silica Sol (Aqueous Base) | 496.00 |
| Glycol Ether | 200.00 |
| Isopropyl Alcohol | 200.00 |
| Total | 1,000.00 |

This invention describes a new and completely original chemically hardenable silicate binder with high colloidal silica sol content imparted by the use of glycol ether. Common glycol ethers are produced by the reaction of ethylene oxide and alcohols forming a very large molecule containing both an ether and alcohol group within a single molecule. The glycol ethers also contain a hydroxyl group making them active as solvents in silicate binders. The hydrolysis reaction for conventional ethyl silicate binders may be written as follows:

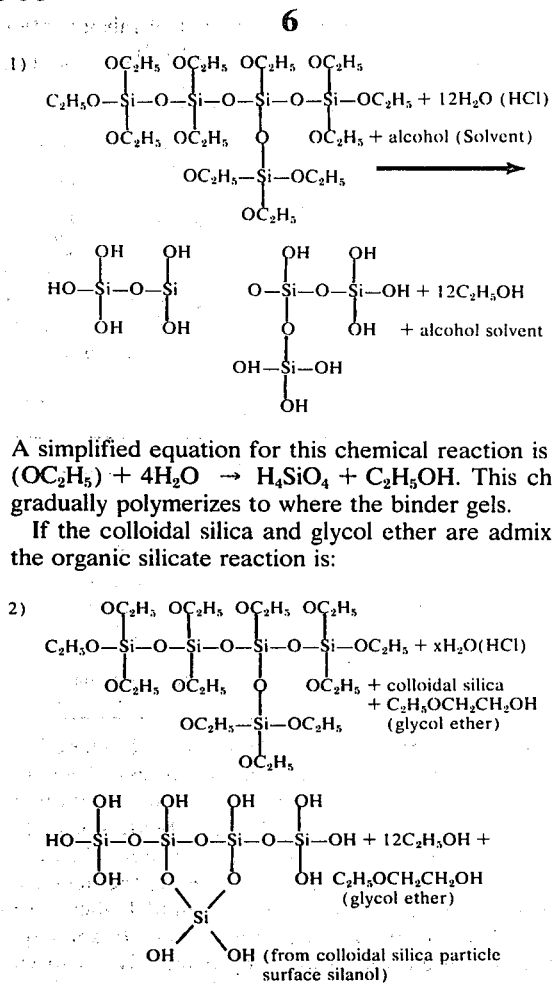

A simplified equation for this chemical reaction is $Si(OC_2H_5) + 4H_2O \rightarrow H_4SiO_4 + C_2H_5OH$. This chain gradually polymerizes to where the binder gels.

If the colloidal silica and glycol ether are admixed, the organic silicate reaction is:

The remarkable binder (Equation 2) is produced by the hydrolyzed ethyl silicate selectively attaching to the colloidal silica particles and results in rapid aging or polymerization being blocked by the large, bulky glycol ether molecules. Another theoretical consideration of the mechanism forming this high strength-long shelf life binder is the hydrogen bonding of glycol ether with the reactive silanol groups of the ethyl silicate, which will limit polymerization. The binder of this invention, Equation 2, is completely unique from conventional hydrolyzed ethyl silicate binders of Equation 1.

Binders taught by prior art cannot tolerate high percentages of colloidal silica sol without rapid aging and gellation. Colloidal silica sol provides high binding surface area at a lower cost to the binder thus improving strength, thermal expansion characteristics and oven temperature requirements over other known binders. Table I shows binders prepared in accordance with U.S. Pat. No. 2,842,445 (1), U.S. Pat. No. 3,576,652 (2) and U.S. Pat. No. 3,682,668 (3).

Table I

| | Prior Art Binder Properties | | | | |
|---|---|---|---|---|---|
| Binder Type | Colloidal Silica Weight % | Ethyl Silicate Weight % | Final Binder % $SiO_2$ | Days to Gellation | Fired Binder Strength-PSI |
| 1 | 15.42 | 69.18 | 33 | <1 | Unstable |
| 2 | 13.27 | 34.27 | 20 | 134 | 25 PSI avg. |
| 3 | 11.3 | 14.8 | 10 | >176 | Lower than could measure |

The binder properties of the binder of this invention shown in example 1 are given in Table II.

Table II

| | Properties of Binder of this Invention | | | | |
|---|---|---|---|---|---|
| Binder Type | Colloidal Silica Weight % | Ethyl Silicate Weight % | Final Binder % SiO$_2$ | Days to Gellation | Fired Binder Strength-PSI |
| 4 | 55.0 | 11.4 | 21 | 200 | 108 PSI avg. |

A comparison of silica ratios in prior art binders is presented in Table III. This table shows that none of these binders approach the ratios of 0.09 to .9 achievable with this invention.

Table III

| Binder | Silica Ratio |
|---|---|
| U.S. Pat. No. 2,842,445 | |
| Example 2 | 5.8 |
| Example 3 | 13.6 |
| Example 7 | 7.4 |
| U.S. Pat. No. 3,576,652 | |
| Example IA | 2.35–3.71 |
| Example IB | 6.15–14.5 |
| Example IC | 3.6 |
| Example III | 2.03 |
| U.S. Pat. No. 3,682,668 | |
| Example I & II | Not Applicable |
| Example III | 1.87 |

The unique effect of glycol ether in this binder allows for wide variation in acid content, excess water and degree of hydrolysis without premature gellation. In conventional hydrolyzed ethyl silicate binders, shelf life can be increased by lowering excess water, silica content, degree of hydrolysis while keeping the acid content relatively high. The ratio of colloidal silica sol to ethyl silicate is important to binder stability and capability. The preferred ratio is approximately 6:1 in volume ratio. If ethyl silicate is reduced below 5%, an unsatisfactory or no gel is experienced. If ethyl silicate is above 10%, binder strength is reduced and binder cost increased. Colloidal silica content below 30% does not appreciably increase binder strength. Colloidal silica over 75% produces an unsatisfactory soft gel. Table IV shows four binders produced with the same method as the binder type 4 (Example I), but with improper amounts of starting materials.

Table IV

| Hybrid Binders with Improper Amounts of Starting Materials | | | | | |
|---|---|---|---|---|---|
| Binder Type | Colloidal Silica Weight % | Ethyl Silicate Weight % | Final Binder % SiO$_2$ | Days to Gellation | Fired Binder Strength-PSI |
| 5 | 35 | 50 | 31 | <1 | Unstable |
| 6 | 55 | 4.5 | 17 | >200 | No Gel |
| 7 | 80 | 7 | 27 | >200 | Poor Soft Gel |
| 8 | 28 | 10 | 12.5 | >200 | 10 PSI avg. |

The hybrid binder of this invention has advantages over other binders known to investment foundries. It has been thoroughly tested and is a reality in many foundries today. The colloidal silica sol species increase available surface area for bonding, thus increasing strength over that available from present commercial binders. The ethyl silicate species imparts the ability to chemically harden by the addition of a gelling agent, such as ammonium hydroxide. This gellation can be time controlled to desired set times. The glycol ether species adds stability to the binder and provides an alcohol free binder that is acceptable to OSHA regulations pertaining to solvent storage. The hybrid binder offers better wetability of refractory aggregates and mold patterns over other conventional binders. This characteristic is enhanced by the glycol ether and reduces foundry mixing time for slurries and increases mold integrity. The hybrid binder affords lower oven temperatures for baking molds because of the low content of ethyl silicate. The hybrid binder allows for ease of automation because it air dries twice as fast as conventional colloidal silica binders, it has command gelling capability like conventional ethyl silicate binders, and has the improved wetting characgeristics which limits the need of special foundry operations to remove air bubbles and the like.

I claim:

1. The method of preparing a hybrid silicate binder comprising the steps of admixing the following:
   a. 30–60 parts by volume glycol ether having the formula $C_nH(2n+1)OCH_2CH_2OH$ where $n = 1, 2, 3$ or 4;
   b. 30–75 parts by volume colloidal silica sol comprising at least about 28% available $SiO_2$ and selected from the group of basic colloidal silica sol and acidic colloidal silica sol;
   c. 5–25 parts by volume of organic silicate comprising at least about 28% available $SiO_2$ and selected from the group of ethyl silicate, ethylene glycol monoethyl ether silicate, propyl silicate and butyl silicate, said organic silicate being hydrolyzed with 1-2% water and containing sufficient acid to provide final binder pH of 1–4;
   d. The volume and composition of the constituents added pursuant to b. and c. being chosen so that the ratio of % $SiO_2$ by weight contributed by the c. constituents to the % $SiO_2$ by weight contributed by the b. constituents to the final binder is between 0.09 and .9.

2. The method according to claim 1 wherein the colloidal silica sol is aqueous base.

3. The method according to claim 1 wherein the colloidal silica sol is glycol ether base prepared by distillation of the aqueous base where glycol ether replaces the water.

4. A method according to claim 1 wherein aqueous colloidal silica sol is dispersed in a glycol ether media.

5. A method according to claim 1 wherein the colloidal silica sol is dispersed in isopropyl alcohol.

6. A method according to claim 1 wherein the acid is sulfuric acid.

7. A method according to claim 1 wherein the acid is hydrochloric acid.

8. A method according to claim 1 wherein the acid is nitric acid.

9. A method according to claim 1 wherein the acid is phosphoric acid.

10. A method according to claim 1 in which all part a. and c. constituents are combined in a first mixing step, and thereafter the part b. constituents are added slowly with continuous mixing.

11. A method according to claim 1 wherein the organic silicate is hydrolyzed with water and acid and mixed with the products of claim 4, resulting in the hydrolyzed organic silicate species selectively attaching to the colloidal silica sol particles.

12. A method according to claim 1 wherein the colloidal silica sol is glycol ether base and is mixed with the hydrolyzed organic silicate.

* * * * *